Patented May 20, 1924.

1,494,544

UNITED STATES PATENT OFFICE.

WILFRID PAUL HEATH, OF CHICAGO, ILLINOIS.

FACIAL PREPARATION AND PROCESS OF GASEOUS MEDICATION THEREOF.

No Drawing.      Application filed January 7, 1922. Serial No. 527,627.

*To all whom it may concern:*

Be it known that I, WILFRID PAUL HEATH, a citizen of the United States, resident of Chicago, in the county of Cook and State of Illinois, have invented certain new and useful Improvements in Facial Preparations and Processes of Gaseous Medication Thereof, of which the following is a specification.

This invention relates to improvements in facial preparations such as pomades, face cream, etc., and the invention consists generally in a facial preparation having incorporated therein microscopic bubbles of carbon dioxide ($CO_2$) or other non-oxidizing gas.

The invention consists generally in the facial preparation hereinafter described and particularly pointed out in the claims, and in the method of medicating such preparation.

Heretofore it has been difficult to produce satisfactory facial preparations as the same were liable to spoil, owing to the fact that such preparations are usually whipped or agitated for the purpose of reducing the specific gravity thereof, by the incorporation of tiny bubbles of air.

In carrying out my invention I place in a suitable container a sufficient amount of carbon dioxide ($CO_2$) gas, which, being heavier than air, will, as it rises in the container, force the air out of the container, and when sufficient gas has been received in the container, the desired materials are put into the container and are thereby completely enveloped by the carbon dioxide gas. A further supply of carbon dioxide gas is added to the container until all of the air is driven therefrom and the container is filled with the carbon dioxide gas, completely enveloping and surrounding the materials that have been placed in the container.

The container is then suitably agitated, and microscopic bubbles of carbon dioxide gas ($CO_2$) become incorporated in the material, while the air is wholly expelled therefrom. After the carbon dioxide gas has become thoroughly incorporated in the material in the container, the container is sealed up and is ready for the market.

If the facial preparation was made in an atmosphere of air, the oxygen from the air would, in time, oxide the fats of the preparation, causing the same to very quickly spoil. The carbon dioxide gas, incorporated into the preparation by my process, not only prevents oxidation and the resulting spoiling of the preparation, but the addition of this gas to the preparation contributes to the soothing and healing effect thereof.

I claim as my invention:

1. The process of gaseously medicating facial cream preparations, which consists in incorporating in said preparation, minute bubbles of non-oxidizing gas to produce a dermal cream of reduced specific gravity and having a soothing or healing effect, and sealing up the cream for future use.

2. The process of gaseously medicating facial cream preparations, which consists in incorporating in said preparation minute bubbles of carbon dioxide gas to produce a dermal cream of reduced specific gravity and having a soothing or healing effect, and sealing up the cream for future use.

3. A facial cream preparation having minute quantities of carbonic acid gas ($CO_2$) incorporated therein to provide a dermal cream having a soothing or healing effect.

4. A facial cream preparation having minute quantities of non-oxidizing gas incorporated therein to provide a dermal cream having a soothing or healing effect.

In witness whereof, I have hereunto set my hand this 10th day of October, 1921.

WILFRID PAUL HEATH.